(12) United States Patent
Sakaguchi et al.

(10) Patent No.: US 9,764,621 B2
(45) Date of Patent: Sep. 19, 2017

(54) VEHICLE AIR-CONDITIONING DISCHARGE PORT STRUCTURE

(75) Inventors: Mitsuaki Sakaguchi, Wako (JP); Masayuki Miyagawa, Wako (JP); Hiroyuki Inoue, Toyoake (JP)

(73) Assignee: HONDA MOTOR CO., LTD., Tokyo (JP)

( * ) Notice: Subject to any disclaimer, the term of this patent is extended or adjusted under 35 U.S.C. 154(b) by 661 days.

(21) Appl. No.: 12/578,866

(22) Filed: Oct. 14, 2009

(65) Prior Publication Data

US 2010/0093269 A1    Apr. 15, 2010

(30) Foreign Application Priority Data

Oct. 15, 2008   (JP) .................................. 2008-266853

(51) Int. Cl.
*B60H 1/34* (2006.01)

(52) U.S. Cl.
CPC .................................. *B60H 1/3421* (2013.01)

(58) Field of Classification Search
CPC ....................................................... B60H 1/34
USPC ................................. 454/154, 322, 156, 155
See application file for complete search history.

(56) References Cited

U.S. PATENT DOCUMENTS

| 7,604,533 B2 | 10/2009 | Ogura et al. |
| 7,887,400 B2 * | 2/2011 | Shibata et al. ................ 454/155 |
| 2002/0178744 A1 * | 12/2002 | Tanabe et al. .................. 62/407 |

FOREIGN PATENT DOCUMENTS

| JP | 62-130345 | 8/1987 |
| JP | 3-82209 | 8/1991 |
| JP | 07-205648 | 8/1995 |
| JP | 2002-337544 | 11/2002 |
| JP | 2007-106391 | 4/2007 |

OTHER PUBLICATIONS

Chinese Office Action dated Nov. 24, 2011.
Chinese Office Action dated Aug. 23, 2012.

* cited by examiner

*Primary Examiner* — Steven B McAllister
*Assistant Examiner* — Samantha Miller
(74) *Attorney, Agent, or Firm* — Rankin, Hill & Clark LLP

(57) ABSTRACT

A vehicle air-conditioning discharge port structure wherein the airflow direction of air-conditioning drafts can be adjusted by changing the orientation of a plurality of fins provided to a discharge port. The fins include an outermost fin and an adjacent fin adjacent to the outer fins. The outer fin has a first regulating part for regulating the air-conditioning drafts flowing through an inter-fin flow passage between the outer fin and the adjacent fin, and a second regulating part for regulating the air-conditioning drafts flowing through a flow passage between the outer fin and a wall part.

10 Claims, 8 Drawing Sheets

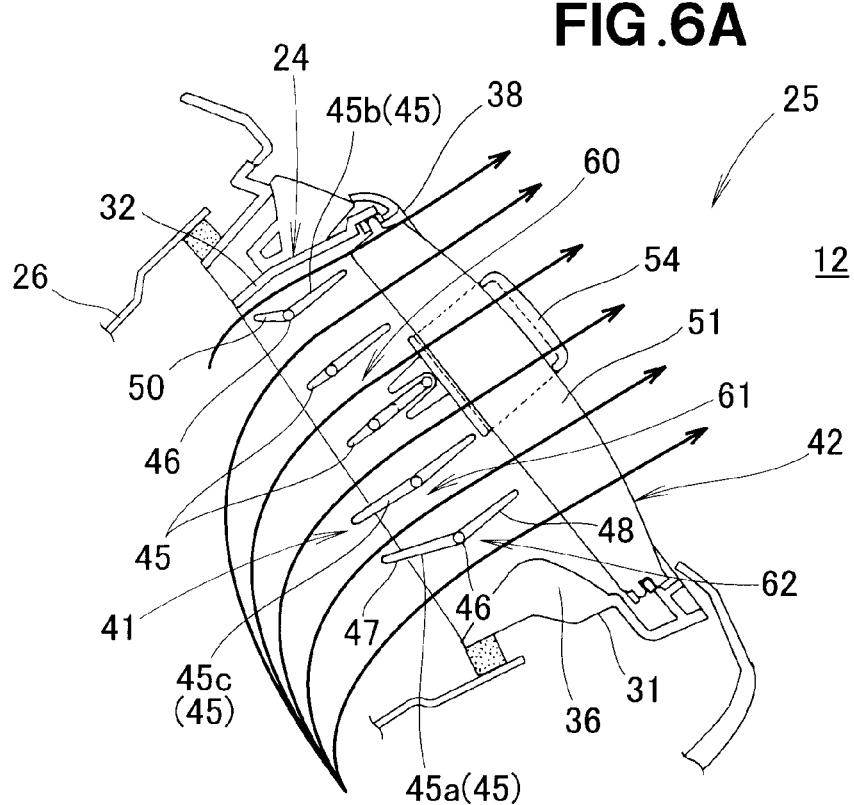
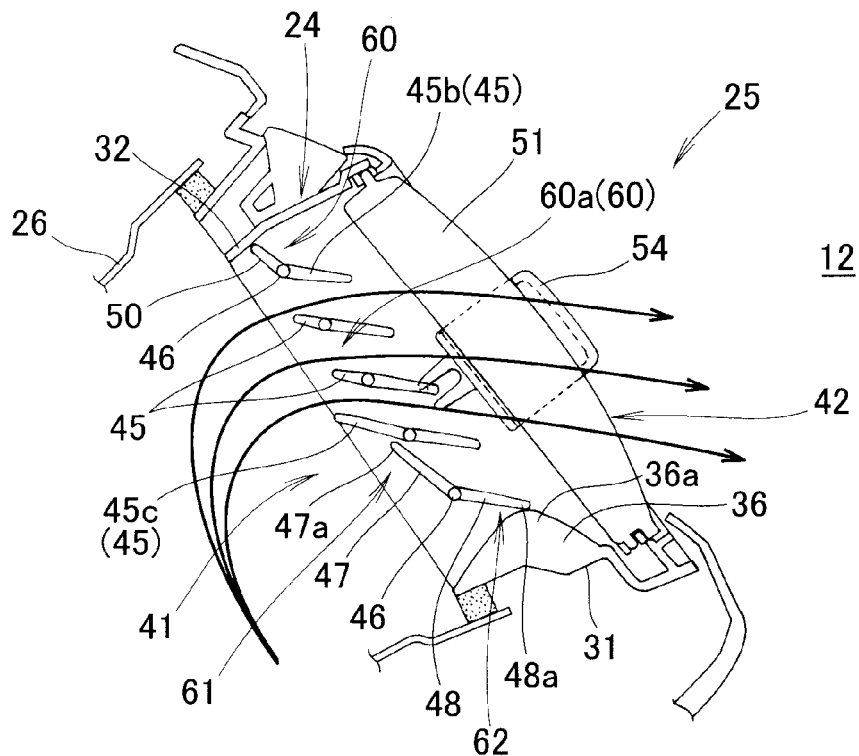

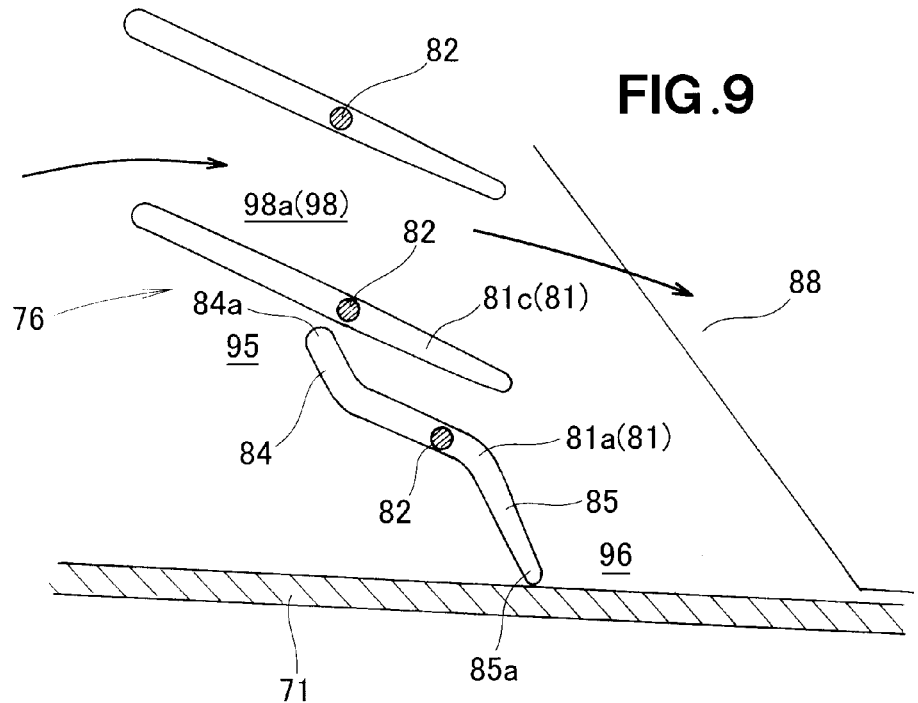
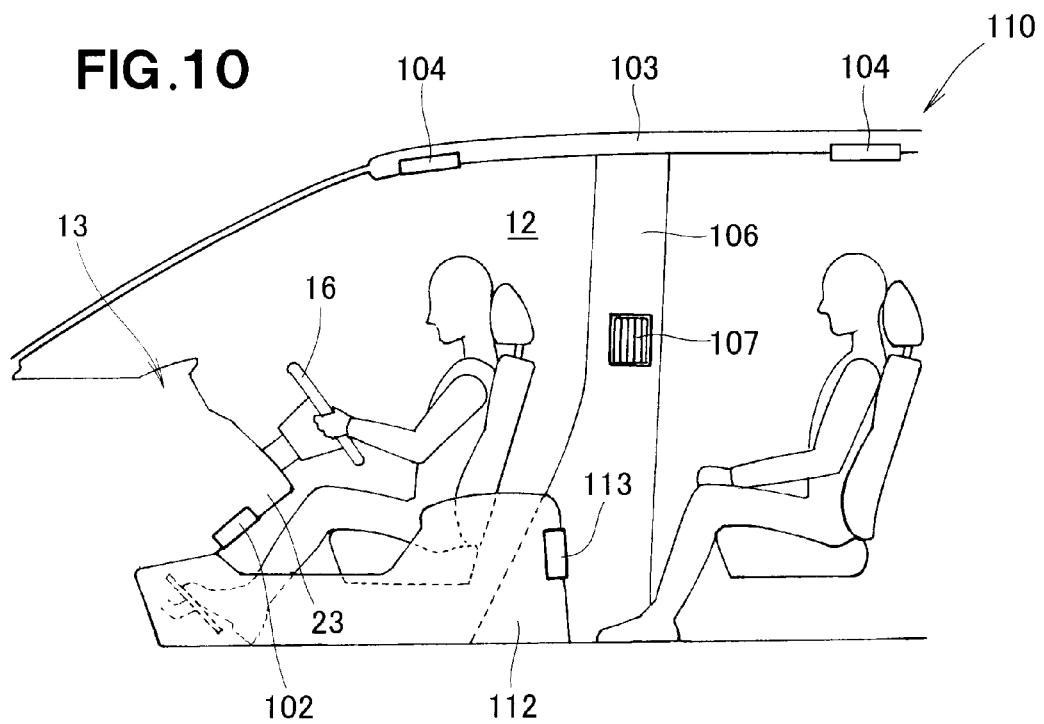

VEHICLE AIR-CONDITIONING DISCHARGE PORT STRUCTURE

FIELD OF THE INVENTION

The present invention relates to a vehicle air-conditioning discharge port structure wherein discharge ports for discharging air-conditioning drafts into a passenger compartment are provided to air-conditioning ducts, the orientation of fins provided to the discharge ports can be changed, and the airflow direction can be adjusted.

BACKGROUND OF THE INVENTION

In a vehicle air-conditioning discharge port structure, a discharge port is provided to an air-conditioning duct in order to blow an air-conditioning draft into a passenger compartment, and a plurality of fins is provided in parallel at predetermined intervals inside the discharge port. The plurality of fins comprises a plurality of horizontal fins disposed in parallel in a vertical direction, and a plurality of vertical fins disposed in parallel in a horizontal direction.

Swinging the orientation of the plurality of horizontal fins in the vertical direction adjusts the airflow direction of the air-conditioning draft in the vertical direction. Swinging the orientation of the plurality of vertical fins horizontally adjusts the airflow direction of the air-conditioning draft in the horizontal direction (for example, see Japanese Patent No. 3605577).

The discharge port structure disclosed in Japanese Patent No. 3605577 has discharge ports formed as rectangular cylinders, and a plurality of fins provided inside the discharge ports. Therefore, when the orientation of the plurality of fins is changed and the airflow direction is adjusted downward, the air-conditioning drafts guided by the fins adjacent to the walls of the discharge ports are led in a different direction from the downward orientation by the wall surfaces adjacent to the fins. Therefore, the wall surfaces interfere with part of the air-conditioning drafts, which flow in a direction that is different from the desired airflow direction, and it is difficult to satisfactorily adjust the airflow direction of the air-conditioning drafts.

SUMMARY OF THE INVENTION

It is an object of the present invention to provide a vehicle air-conditioning discharge port structure whereby the airflow direction of air-conditioning drafts can be satisfactorily adjusted.

According to the present invention, there is provided a vehicle air-conditioning discharge port structure comprising: a discharge port for discharging air-conditioning drafts blown from an air-conditioning duct; and a plurality of fins provided in parallel at predetermined intervals from one wall part of the discharge port to another wall part opposite the first wall part, the fins being capable of adjusting an airflow direction of air-conditioning drafts by changing an orientation thereof, wherein the fins include an outer fin adjacent to either a first wall part or other wall part, and an adjacent fin adjacent to the outer fin, and wherein the outer fin include: a first regulating part for regulating the air-conditioning drafts flowing through an inter-fin flow passage between the outer fin and the adjacent fin; and a second regulating part for regulating the air-conditioning drafts flowing through an inter-wall flow passage between the outer fin and the wall adjacent to the outer fin.

In the present invention, the term "outer fin" refers to the fin among the plurality of fins that is adjacent to either the first wall or the other wall, and these outer fins have first regulating parts and second regulating parts. The first regulating part is designed so as to restrict the air-conditioning drafts flowing through an inter-fin flow passage between the outer fin and the adjacent fin. The second regulating part is designed so as to restrict the air-conditioning drafts flowing through an inter-wall flow passage between the outer fin and the wall adjacent to the outer fin.

Thus, the air-conditioning drafts in the inter-fin flow passage are regulated by the first regulating part, and the air-conditioning drafts in the inter-wall flow passage are regulated by the second regulating part, whereby the air-conditioning drafts gather in the center of the discharge port and the air-conditioning drafts can be blown in the desired direction by the center fin. It is thereby possible to blow all of the air-conditioning drafts in the desired direction, and to satisfactorily adjust the airflow direction of the air-conditioning drafts without reducing the air quantity blown in the desired direction.

It is preferred that only one of either the first wall part or the other wall part have a protrusion that protrudes toward the outer fin in order to regulate the air-conditioning drafts in the inter-wall flow passage, and that the outer fin be formed so that the first regulating part approaches the adjacent fin when the second regulating part approaches a distal end of the protrusion. Therefore, the first regulating part and the second regulating part can be inclined in a direction away from the distal end of the protrusion. It is thereby possible to ensure satisfactory air-conditioning drafts flowing between the protrusion and the outer fin when the drafts are not being regulated, and to minimize the effect of the protrusion, increasing the degree of freedom in the design.

It is also preferred the outer fin have a support part for swingably supporting the outer fin, and that the support part be provided between the first regulating part and the second regulating part. Consequently, swinging the outer fin about the support part allows the first regulating part to be moved toward the adjacent fin, and the second regulating part to be moved toward the wall of the discharge port. The air-conditioning drafts flowing through the inner-side flow passage of the discharge port can thereby be regulated by the first regulating part, and the air-conditioning drafts flowing through the passenger compartment-side flow passage of the discharge port can be regulated by the second regulating part. In other words, the air-conditioning drafts flowing through the flow passages of the discharge port can be simultaneously regulated by both the first and second regulating parts.

It is preferred that the discharge port be formed so that a distal end thereof is inclined along a surface of a vehicle interior material; that the fins have a plurality of interior fins disposed in a distal end of the discharge port in parallel at predetermined horizontal intervals, and also disposed along the inclined direction of the surface; and a plurality of inner fins disposed inward of the interior fins in parallel at predetermined vertical intervals, and also disposed in a direction that intersects the inclined direction of the surface; and that the outer fin be the inner fin that is adjacent to the wall of the discharge port.

Furthermore, the discharge port may be formed so that a distal end thereof is inclined along a surface of the vehicle interior material. The fins may have a plurality of interior fins disposed in the distal end of the discharge port in parallel at predetermined longitudinal intervals, and also disposed along the inclined direction of the surface; and a plurality of inner fins disposed inward of the interior fins in parallel at predetermined transverse intervals, and also disposed along the inclined direction of the surface. The outer fin may be the inner fin that is adjacent to the wall of the discharge ports.

Thus, the distal end of the discharge port is provided in a state of being inclined along the surface of the vehicle interior material, and a plurality of interior fins is disposed along the inclined direction of the surface. It is thereby possible to dispose the interior fins along the incline of the surface of the vehicle interior material, to provide the interior fins so as to be coplanar (i.e., to preserve continuity) with the surface, and to further improve the outward appearance of the vehicle interior material.

Furthermore, the fin among the inner fins that is adjacent to the wall of the discharge port is denoted as an outer fin. The outer fin is provided with a first regulating part and a second regulating part. Consequently, the air-conditioning drafts gather in the center of the discharge port, and the gathered air-conditioning drafts can be blown in the desired direction by the center inner fin. It is thereby possible to blow all of the air-conditioning drafts in the desired direction, and to satisfactorily adjust the airflow direction of the air-conditioning drafts without reducing the air quantity in the desired direction.

BRIEF DESCRIPTION OF THE DRAWINGS

Certain preferred embodiments of the present invention will be described in detail below, by way of example only, with reference to the accompanying drawings, in which:

FIGS. 6A and 6B are schematic views showing an example mode of blowing an air-conditioning draft into a passenger compartment by the discharge port structure according to the present invention;

FIG. 9 is a cross-sectional view showing right inner fins in FIG. 8 as having been adjusted to a downward orientation; and FIG. 10 is a side view of a vehicle showing the regions where discharge port structures of the present invention are installed.

DESCRIPTION OF THE PREFERRED EMBODIMENTS

Figure 1:
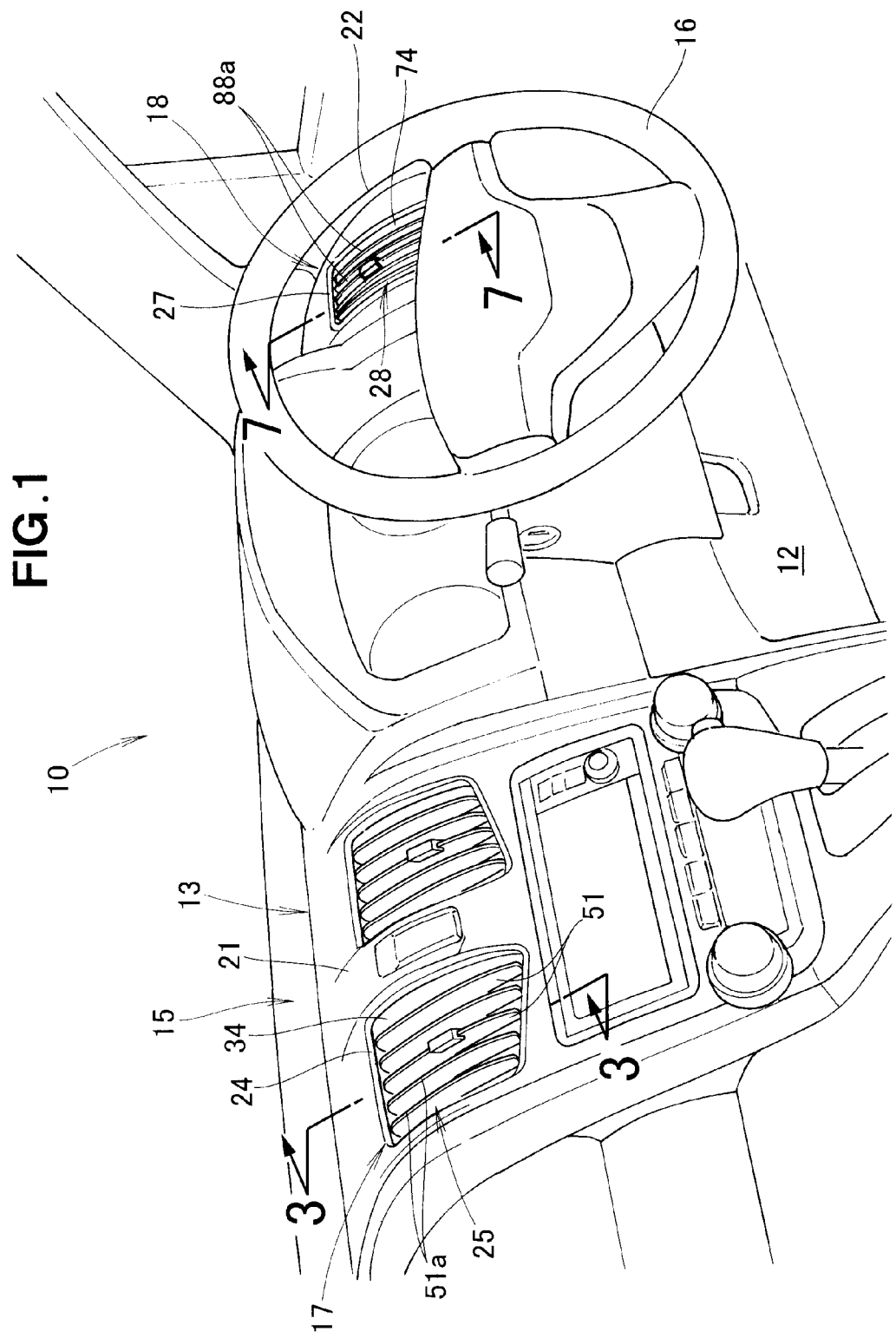
FIG. 1 is a perspective view showing a vehicle employing a vehicle air conditioning discharge port structure according to the present invention.

A vehicle 10 shown in FIG. 1 comprises an instrument panel (vehicle interior material) 13 provided to the front part of a passenger compartment 12, a vehicle air-conditioning discharge port structure 15 provided to the instrument panel 13, and a steering wheel 16 protruding from the instrument panel 13 into the passenger compartment 12.

The vehicle air-conditioning discharge port structure 15 comprises a center discharge port unit 17 provided to a center part 21 of the instrument panel 13, and left and right discharge port units 18 (only the right discharge port unit 18 is shown) provided respectively to left and right ends 22 of the instrument panel 13.

The center discharge port unit 17 comprises a center discharge port (discharge port) 24 provided to the center part 21 of the instrument panel 13, center fins (a plurality of fins) 25 provided inside the center discharge port 24, and a center air-conditioning duct (air-conditioning duct) 26 (see FIG. 3) running through the center discharge port 24.

The right discharge port unit 18 comprises a right discharge port (discharge port) 27 provided to the right end 22 of the instrument panel 13, right fins (a plurality of fins) 28 provided inside the right discharge port 27, and a right air-conditioning duct (air-conditioning duct) 29 (see FIG. 7) provided so as to run through the right discharge port 27.

Figure 2:
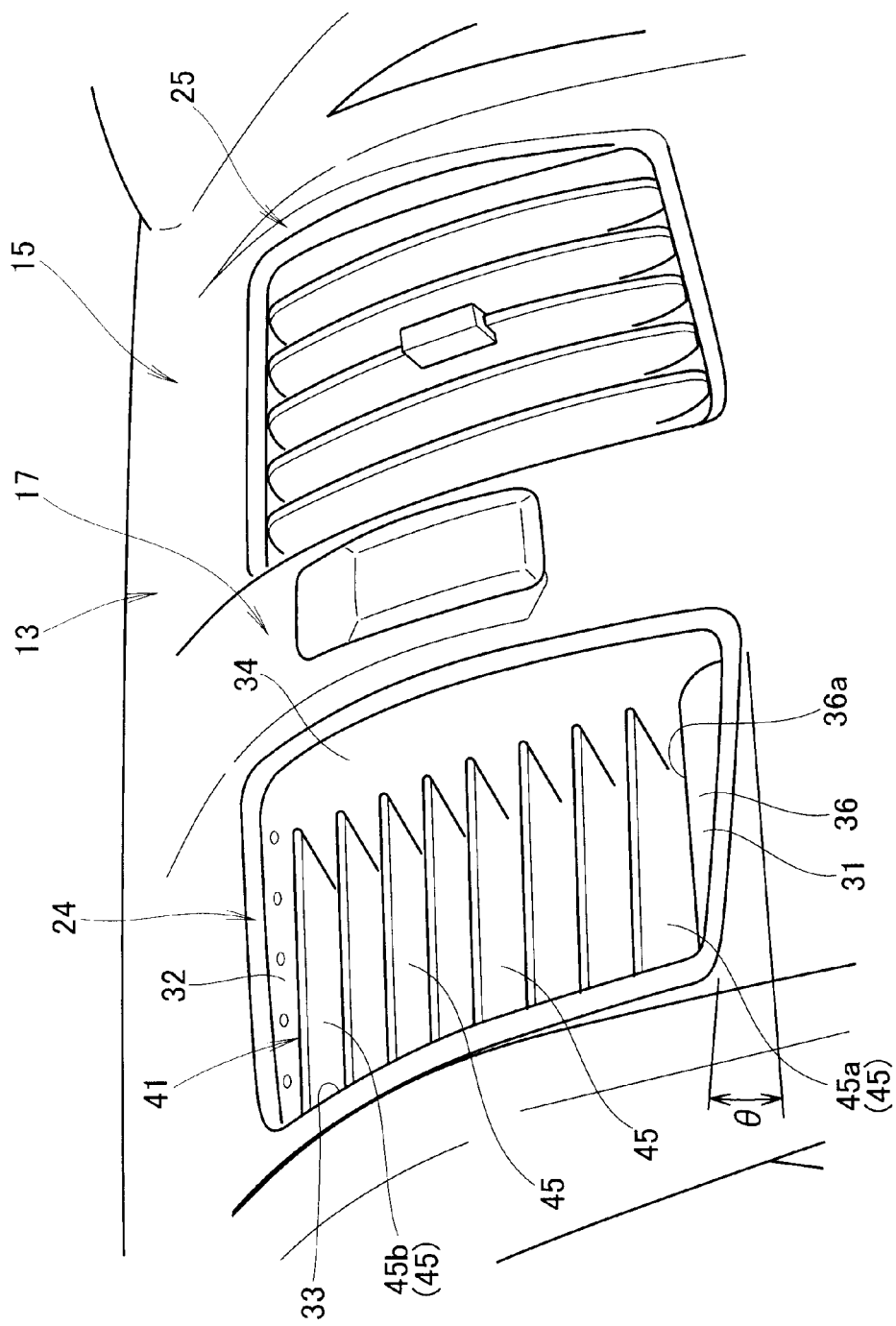
FIG. 2 is a perspective view showing a center discharge port unit of FIG. 1 with interior fins removed.
Figure 3:
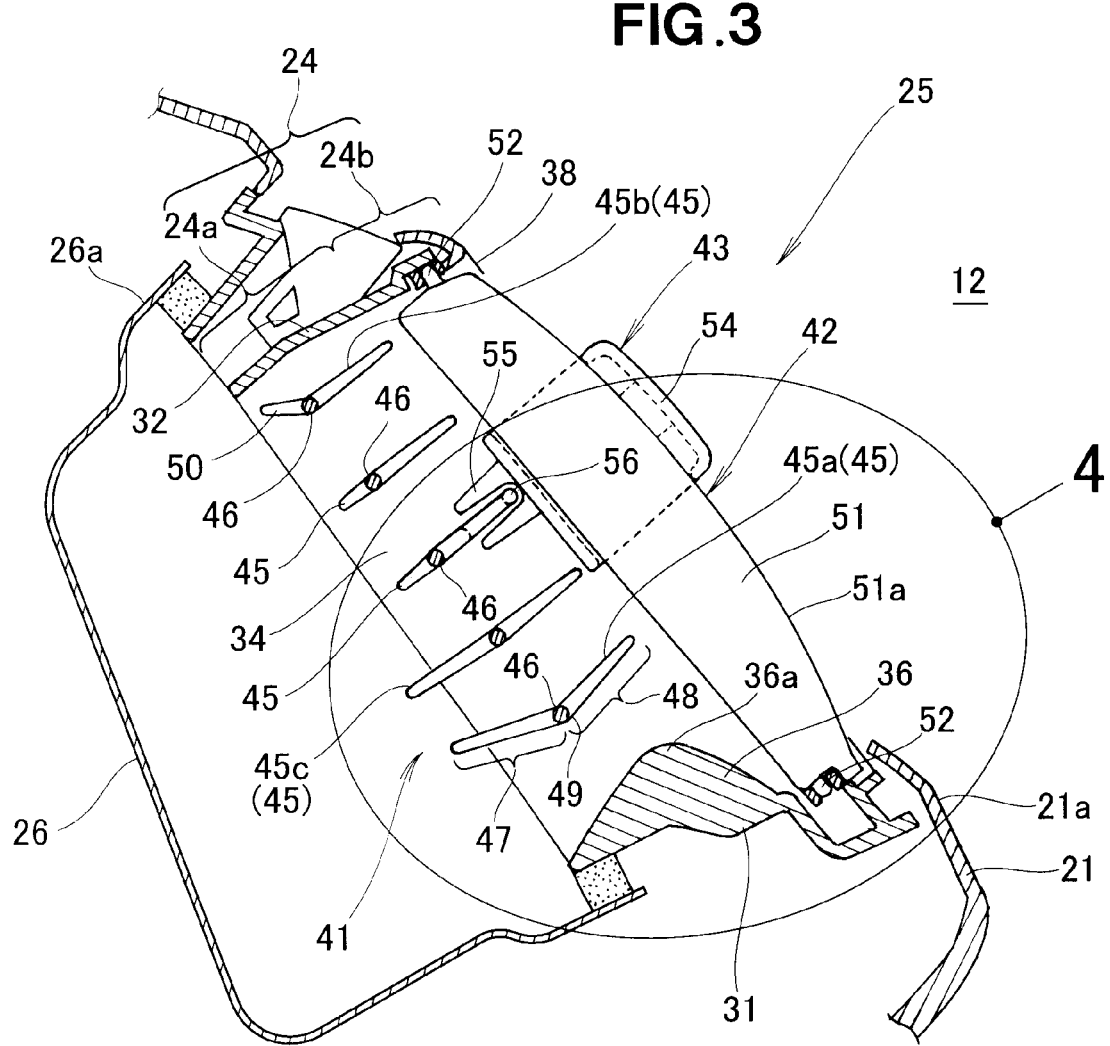
FIG. 3 is a cross-sectional view taken along line 3-3 of FIG. 1.

The center discharge port 24 is provided at an upward incline toward the front of the vehicle body, and a distal end 38 as an air-blowing port is opened in the top surface (surface) 21a of the center part 21, as shown in FIGS. 2 and 3.

The center discharge port 24 comprises a bottom wall (one wall) 31, a top wall (another wall) 32 provided at the top so as to be opposite the bottom wall 31, a left side wall 33 provided on the left side, and a right wall 34 provided on the right side so as to be opposite the left side wall 33. The center discharge port 24 is formed into an oblong and substantially rectangular annular shape (cylindrical shape) by the bottom wall 31, the top wall 32, the left side wall 33, and the right wall 34.

The center discharge port 24 is formed in a state of being inclined such that the distal end 38 is inclined upward along the top surface 21a of the center part 21. The air-conditioning draft of an air-conditioning device (not shown) is blown out from the distal end 38 to the center inside the passenger compartment 12.

The bottom wall 31 of the center discharge port 24 is formed at a downward incline of an inclination angle θ from the left side wall 33 toward the right wall 34, as shown in FIG. 2. Therefore, the space between the bottom wall 31 and a lowest fin 45a (described hereinafter) gradually increases from the left side wall 33 toward the right wall 34.

In view of this, a protrusion 36 is provided to the bottom wall 31 in order to ensure a uniform space between the lowest fin 45a and the bottom wall 31. The protrusion 36 is made to protrude upward toward the lowest fin 45a. The protrusion 36 is described in detail hereinafter.

The center fins 25 comprise center inner fins (a plurality of inner fins) 41 provided near an inner region 24a of the center discharge port 24, center interior fins (a plurality of interior fins) 42 provided near a compartment interior region 24b of the center discharge port 24, and a center fin operating part 43 for adjusting the orientation of the center inner fins 41 and the center interior fins 42.

The center inner fins 41 are provided near the inner region 24a of the center discharge port 24, and the center interior fins 42 are provided near the compartment interior region 24b, whereby the center inner fins 41 are disposed on the inner side of the center discharge port 24 in relation to the center interior fins 42.

The center inner fins 41 extend horizontally and comprise a plurality of inner fins (fins) 45 aligned vertically. In other words, the inner fins 45 are provided in parallel at predetermined intervals in the vertical direction (longitudinal direction) from the bottom wall 31 to the top wall 32 of the center discharge port 24, and are supported by left and right inner fin support parts (support parts) 46 so as to be capable of swinging vertically. The left and right inner fin support parts 46 protrude from the left and right sides of the inner fins 45 within the same planes. The inner fins 45 are linked so as to be capable of moving together vertically about the left and right inner fin support parts 46 as axes.

In order to make it easier to understand the configuration of the inner fins 45, the inner fin 45 adjacent to the bottom wall 31 is hereinbelow described as the lowest fin 45a and the inner fin 45 adjacent to the top wall 32 is described as a highest fin 45b.

The lowest fin 45a comprises a first regulating part 47 formed in the vehicle body frontal region of the left and right inner fin support parts 46, and a second regulating part 48 formed in the vehicle body rear region of the left and right inner fin support parts 46.

The lowest fin 45a has a curved part 49 in the substantial center in the airflow direction of the air-conditioning draft, the first regulating part 47 and the second regulating part 48 are bent into a dogleg shape at the curved part 49, and the left and right inner fin support parts 46 protrude from the curved part 49. The lowest fin 45a is supported in a vertically swingable manner by the left and right inner fin support parts 46. The first regulating part 47 and the second regulating part 48 are illustrated in detail in FIGS. 4 and 5.

The highest fin 45b comprises a top regulating part 50 forming the vehicle body frontal region of the left and right inner fin support parts 46. The top regulating part 50 is formed at an upward incline toward the front of the vehicle body from the left and right inner fin support parts 46.

The center interior fins 42 extend in the vertical direction and comprise a plurality of interior fins (fins) 51 aligned left to right. The interior fins 51 are provided in parallel (FIG. 1) at predetermined intervals in the left-to-right direction (vehicle width direction) from the left side wall 33 to the right wall 34 of the center discharge port 24, and are supported by top and bottom interior fin support parts 52 so as to be capable of swinging left and right.

The top and bottom interior fin support parts 52 are made to protrude within the same planes from the top and bottom ends of the interior fins 51, respectively. The interior fins 51 are linked so as to be capable of moving together to the left and right about the top and bottom interior fin support parts 52 as axes.

The interior fins 51 are provided in the distal end 38 side of the center discharge port 24. The distal end 38 is opened in the top surface 21a of the center part 21 as previously described. The interior fins 51 comprise interior edges 51a facing the passenger compartment 12. The interior edges 51a are formed into substantially curved shapes so as to bulge toward the passenger compartment 12, and are formed at an upward incline along the inclined direction of the top surface 21a of the center part 21. Consequently, the interior fins 51 are disposed along the incline of the top surface 21a of the center part 21, whereby the interior fins 51 can be provided so as to be uniform (i.e., to preserve continuity) in relation to the line of the top surface 21a. The outward appearance of the top surface 21a of the center part 21 (i.e., of the instrument panel 13) can thereby be further improved.

The center fin operating part 43 comprises an operating knob 54 provided to be capable of sliding vertically on the center interior fin 51 of the interior fins 51, a forked engaging part 55 provided to the operating knob 54, and an interlocking pin 56 engaged with the engaging part 55. The interlocking pin 56 is provided to the front end of the center inner fin 45 of the inner fins 45.

Vertically swinging the operating knob 54 allows the interior fins 51 to be swung in the vehicle width direction about the top and bottom interior fin support parts 52 as axes. The airflow direction of the air-conditioning draft can be adjusted in the vehicle width direction by changing the orientation of the interior fins 51.

Slidably moving the operating knob 54 in the vertical direction along the center interior fin 51 allows the inner fins 45 to be swung vertically about the left and right inner fin support parts 46 as axes. The airflow direction of the air-conditioning draft can be adjusted vertically by changing the orientation of the inner fins 45.

Figure 4:
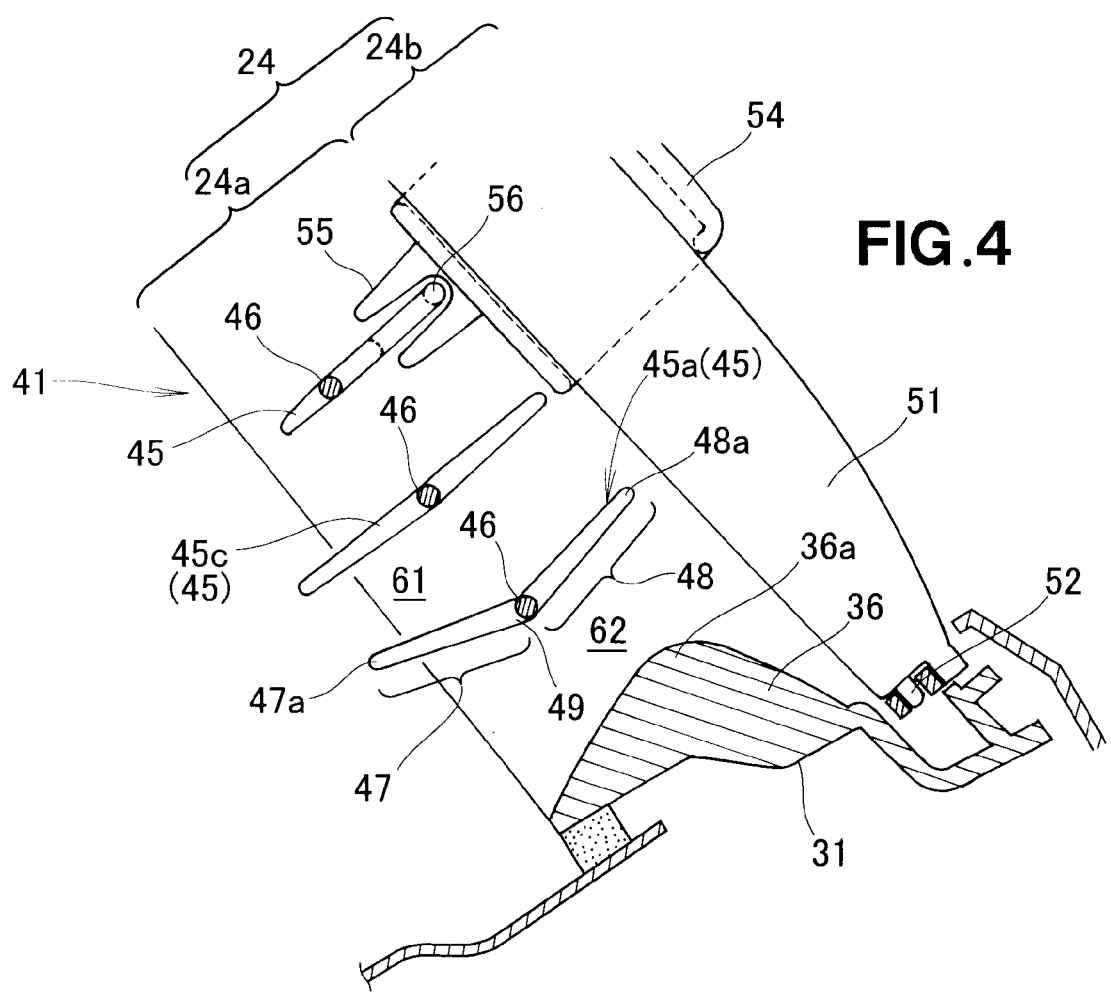
FIG. 4 is an enlarged view showing an area 4 of FIG. 3.

The protrusion 36 is a bulging part that protrudes upward and has a cross-sectional shape tapering toward the lowest fin 45a from the bottom wall 31, as shown in FIG. 4. The protrusion 36 is formed so that the height from the bottom wall 31 to a top end (distal end) 36a gradually increases from the left side wall 33 toward the right wall 34, as shown in FIG. 2. Consequently, the top end 36a of the protrusion 36 extends parallel to the lowest fin 45a along the vehicle width direction. The space between the lowest fin 45a and the bottom wall 31 (i.e., the top end 36a of the protrusion 36) is thereby reliably uniform.

The first regulating part 47 is formed so as to be inclined in the opposite direction (away) from the top end 36a of the protrusion 36. The first regulating part 47 regulates the air-conditioning draft flowing through an inter-fin flow passage 61 formed with an adjacent inner fin (adjacent fin) 45c. The adjacent inner fin 45c is one of the inner fins 45 that is adjacent at a predetermined interval above the lowest fin 45a.

The second regulating part 48 is formed at an upward incline toward the front of the vehicle body so as to be inclined in the opposite direction (away) from the top end 36a of the protrusion 36. The second regulating part 48 regulates the air-conditioning draft flowing through an inter-wall flow passage 62 formed with the protrusion 36. The bottom wall 31 is an adjacent wall across a predetermined interval below the lowest fin 45a.

Thus, the first regulating part 47 and the second regulating part 48 are inclined in the opposite direction (away) from the top end 36a of the protrusion 36. Consequently, these parts are formed so that the first regulating part 47 approaches the adjacent inner fin 45c when the second regulating part 48 approaches the top end 36a of the protrusion 36. It is thereby possible to ensure a satisfactory air-conditioning draft flowing between the protrusion 36 and the lowest fin 45a when the draft is not being regulated, to minimize the effect of the protrusion 36, and to increase the degree of freedom in the design.

Furthermore, the lowest fin 45a is swingably supported on the left and right inner fin support parts 46, and these left and right inner fin support parts 46 are provided between the first regulating part 47 and the second regulating part 48. Consequently, the lowest fin 45a is swung around the left and right inner fin support parts 46, whereby the first regulating part 47 can be moved toward the adjacent inner fin 45c, and the second regulating part 48 can be moved toward the protrusion 36. The air-conditioning draft flowing through the inter-fin flow passage 61 can thereby be regulated by the first regulating part 47, and the air-conditioning draft flowing through the inter-wall flow passage 62 can be regulated by the second regulating part 48. In other words, the air-conditioning drafts flowing through the inter-fin flow passage 61 and the inter-wall flow passage 62 can be simultaneously regulated by the two regulating parts: the first and second regulating parts 47 and 48.

Figure 5:
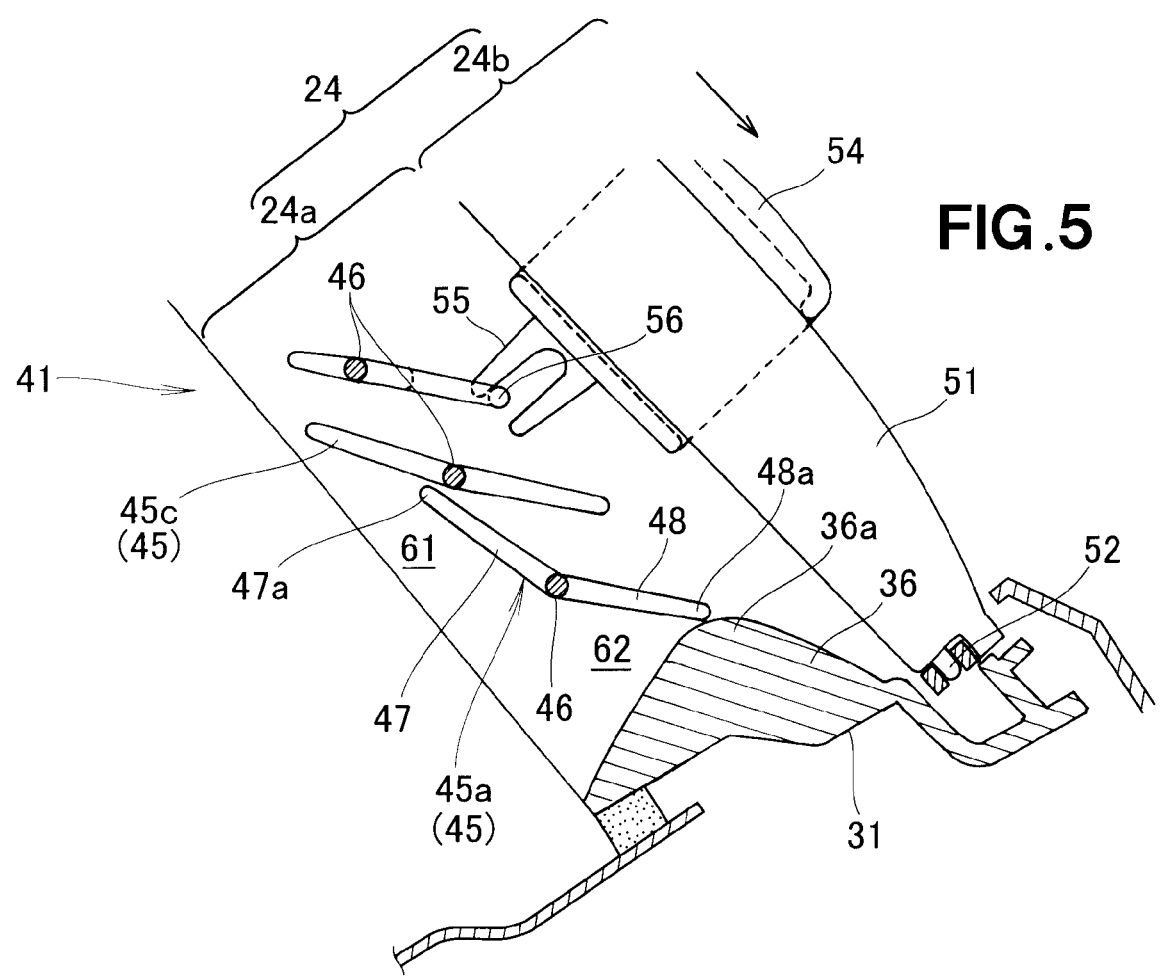
FIG. 5 is a cross-sectional view showing a center inner fin of FIG. 4 as having been adjusted to a downward orientation by a center fin operating part.

The center inner fins 41 are oriented downward by the downward sliding movement of the operating knob 54 indicated by the arrow, as shown in FIG. 5. In other words, the inner fins 45 (including the lowest fin 45a) come to be disposed at a downward incline in the airflow direction of the air-conditioning draft, around the left and right inner fin support parts 46 as axes.

In this state, a front end 47a of the first regulating part 47 in the lowest fin 45a approaches the adjacent inner fin 45c, and the inter-fin flow passage 61 is closed off. Consequently, the air-conditioning draft flowing through the inter-fin flow passage 61 is regulated.

The protrusion 36 is provided to the bottom wall 31, thereby ensuring a uniform space between the lowest fin 45a and the top end 36a of the protrusion 36. Consequently, the lowest fin 45a is adjusted to be oriented downward, whereby a rear end 48a of the second regulating part 48 in the lowest fin 45a approaches the top end 36a of the protrusion 36, and the inter-wall flow passage 62 is closed off. The air-conditioning draft flowing through the inter-wall flow passage 62 can thus be regulated by providing a protrusion 36 to the bottom wall 31.

Next, an example in which the airflow direction of the air-conditioning draft is adjusted by the discharge port structure 15 will be described based on FIGS. 6A and 6B.

In FIG. 6A, the operating knob 54 is adjusted, whereby the inner fins 45 (including the lowest fin 45a) come to be disposed along the airflow direction of the air-conditioning draft. An air-conditioning draft is blown out from the air-conditioning device (not shown), and the blown-out air-conditioning draft is blown as shown by the arrows to the center discharge port 24 via the center air-conditioning duct 26.

The air-conditioning draft blown to the center discharge port 24 is led to the center inner fins 41 as shown by the arrows. The air-conditioning draft led to the center inner fins 41 is blown as shown by the arrows to the center interior fins 42 via flow passages 60 (including the inter-fin flow passage 61 and the inter-wall flow passage 62) between the inner fins 45. The air-conditioning draft blown to the center interior fins 42 is blown as shown by the arrows to the center of the passenger compartment 12 from the distal end 38 of the center discharge port 24, via the interior fins 51.

In FIG. 6B, the operating knob 54 is slidably moved downward, thereby adjusting the center inner fins 41 to a downward orientation. In other words, the inner fins 45 (including the lowest fin 45a) swing about the left and right inner fin support parts 46 as axes and come to be inclined downward in the airflow direction of the air-conditioning draft. Consequently, the air-conditioning draft flowing through the inter-fin flow passage 61 is regulated, and the air-conditioning draft flowing through the inter-wall flow passage 62 is regulated.

The top regulating part 50 of the highest fin 45b approaches the top wall 32, and the air-conditioning draft flowing through the flow passage 60 between the top regulating part 50 and the top wall 32 is regulated.

In this state, the air-conditioning draft is blown out from the air-conditioning device (not shown), and the blown-out air-conditioning draft is blown as shown by the arrows to the center discharge port 24 via the center air-conditioning duct 26. The air-conditioning draft blown to the center discharge port 24 is led as shown by the arrows to the center inner fins 41. The air-conditioning draft led to the center inner fins 41 gathers in a flow passage 60a near the center within the flow passages 60 between the inner fins 45, and the air-conditioning draft can be made to blow downward by the inner fins 45 near the center. Consequently, the air-conditioning draft flowing downward can be separated from the bottom wall 31, and it is therefore possible to prevent part of the air-conditioning draft from being guided to the bottom wall 31 and being led in a different direction. It is thereby possible to blow all of the air-conditioning draft led to the center discharge port 24 downward into the passenger compartment 12 regardless of the shape of the bottom wall 31, and the air-conditioning draft can be satisfactorily blown downward without reducing the quantity of the air-conditioning draft.

Figure 7:
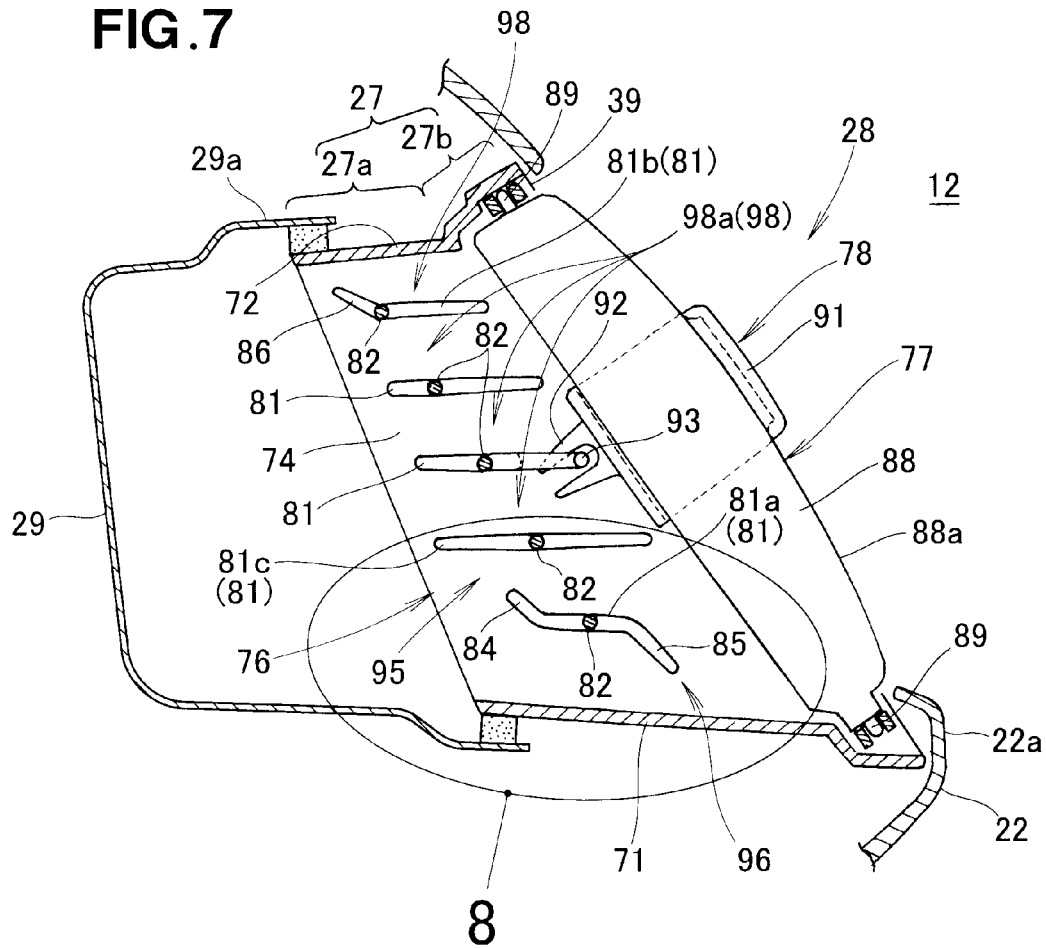
FIG. 7 is a cross-sectional view taken along line 7-7 of FIG. 1.

The right discharge port 27 is provided to be substantially horizontal, and the distal end 39 as the air-blowing port is opened in a top surface (surface) 22a of the right end 22, as shown in FIG. 7. The right discharge port 27 comprises a bottom wall (one wall) 71, a top wall (another wall) 72 provided above so as to be opposite the bottom wall 71, a left side wall (not shown) provided on the left side, and a right wall 74 provided to the right so as to be opposite this left side wall. The right discharge port 27 is formed so as to be oblong with a substantially rectangular annular shape (cylindrical shape) by the bottom wall 71, the top wall 72, the left side wall, and the right wall 74.

The right discharge port 27 is formed in a state of being inclined so that the distal end 39 is inclined upward along the top surface 22a of the right end 22. The air-conditioning draft of the air-conditioning device (not shown) from the distal end 39 is blown into the passenger compartment 12 from the opening of the distal end 39.

The bottom wall 71 of the right discharge port 27 is formed to be horizontal from the left side wall toward the right wall 74, as shown in FIG. 1. Consequently, an even space is ensured between the bottom wall 71 and the lowest fin 81a (described hereinafter). As a result, there is no need to provide the bottom wall 71 with the protrusion 36 shown in FIG. 2.

The right fins 28 comprise right inner fins (a plurality of inner fins) 76 provided near an inner region 27a of the right discharge port 27, right interior fins (a plurality of interior fins) 77 provided near a passenger compartment region 27b of the right discharge port 27, and a right fin operating part 78 for adjusting the orientation of the right inner fins 76 and the right interior fins 77.

By providing the right inner fins 76 near the inner region 27a of the right discharge port 27 and providing the right interior fins 77 near the passenger compartment region 27b, the right inner fins 76 are disposed nearer to the inner side of the right discharge port 27 than are the right interior fins 77.

The right inner fins 76 comprise a plurality of inner fins (fins) 81 aligned so as to extend horizontally in the vehicle width direction. The inner fins 81 are provided in parallel at predetermined vertical intervals from the bottom wall 71 of the right discharge port 27 to the top wall 72, and are supported to be capable of swinging vertically by left and right inner fin support parts (support parts) 82.

The left and right inner fin support parts 82 are made to protrude respectively from the left and right sides of the inner fins 81 within the same planes. The inner fins 81 are all linked to be capable of vertically moving together about the left and right inner fin support parts 82 as axes.

In order to make it easier to understand the configuration of the inner fins 81, the inner fin 81 adjacent to the bottom wall 71 is hereinbelow described as the lowest fin (outer fin) 81a, and the inner fin 81 adjacent to the top wall 72 is described as the highest fin 81b.

The lowest fin 81a comprises a first regulating part 84 whose front end is bent into an upward inclined-shape, and a second regulating part 85 whose rear end is bent into a downward-inclined shape. The left and right inner fin support parts 82 which swingably support the lowest fin 81a are provided in the substantial center of the lowest fin 81a with respect to the longitudinal direction of the vehicle body. The first regulating part 84 and the second regulating part 85 are illustrated in detail in FIGS. 8 and 9.

The highest fin 81b comprises a top regulating part 86, which forms a vehicle body frontal region of the left and right inner fin support parts 82. The top regulating part 86 is formed to be inclined upward toward the front of the vehicle body from the left and right inner fin support parts 82.

The right interior fins 77 comprise a plurality of interior fins (fins) 88 aligned in the vehicle width direction so as to extend vertically. The interior fins 88 are provided in parallel at predetermined left-to-right intervals (transversely) from the left side wall of the right discharge port 27 to the right wall 74 (FIG. 1), and are supported to be capable of swinging left to right by top and bottom interior fin support parts 89. The top and bottom interior fin support parts 89 are made to protrude respectively within the same planes from the top and bottom ends of the interior fins 88. The interior fins 88 are all linked to be capable of moving together to the left and right about the top and bottom interior fin support parts 89 as axes.

The interior fins 88 are provided in the distal end 39 of the right discharge port 27. The distal end 39 is opened in the top surface 22a of the right end 22, as previously described. The interior fins 88 comprise interior edges 88a facing the passenger compartment 12. The interior edges 88a are formed into substantially curved shapes so as to bulge toward the passenger compartment 12, and are also formed at an upward incline along the inclined direction of the top surface 22a of the right end 22. Consequently, the interior fins 88 are disposed along the incline of the top surface 22a of the right end 22, whereby the interior fins 88 can be provided so as to be coplanar (i.e., to preserve continuity) with the top surface 22a. The outward appearance of the top surface 22a of the right end 22 (i.e., of the instrument panel 13) can thereby be further improved.

The right fin operating part 78 comprises an operating knob 91 provided to be capable of sliding vertically on the center interior fin 88 of the interior fins 88, a forked engaging part 92 provided to the operating knob 91, and an interlocking pin 93 engaged with the engaging part 92. The interlocking pin 93 is provided to the front end of the center inner fin 81 of the inner fins 81.

Swinging the operating knob 91 to the left and right allows the interior fins 88 to be swung to the left and right about the top and bottom interior fin support parts 89 as axes. Changing the orientation of the interior fins 88 adjusts the airflow direction of the air-conditioning draft to the left and right.

Figure 8:
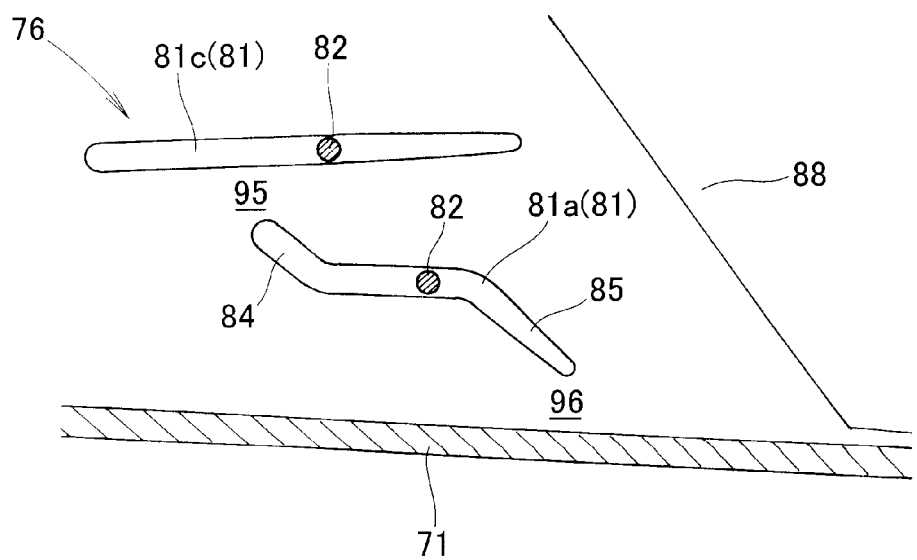
FIG. 8 is an enlarged view of an area 8 of FIG. 7.

Slidably moving the operating knob 91 vertically along the center interior fin 88 allows the inner fins 81 to be swung vertically about the left and right inner fin support parts 82 as axes. Changing the orientation of the inner fins 81 vertically adjusts the airflow direction of the air-conditioning draft The first regulating part 84 is formed at an upward incline so as to be inclined away from the bottom wall 71, as shown in FIG. 8. The first regulating part 84 regulates (controls) the air-conditioning draft flowing through an inter-fin flow passage 95 formed with an adjacent inner fin (adjacent fin) 81c.

The adjacent inner fin 81c is adjacent across a predetermined interval above the lowest fin 81a from among the inner fins 81.

The second regulating part 85 is formed at a downward incline toward the rear of the vehicle body so as to be inclined toward the bottom wall 71. The second regulating part 85 regulates an inter-wall flow passage 96 formed with the bottom wall 71. The bottom wall 71 is adjacent across a predetermined interval below the lowest fin 81a.

The lowest fin 81a is swingably supported by the left and right inner fin support parts 82, and the left and right inner fin support parts 82 are provided between the first regulating part 84 and the second regulating part 85. Consequently, the lowest fin 81a is swung around the left and right inner fin support parts 82, whereby the first regulating part 84 can be moved toward the adjacent inner fin 81c, and the second regulating part 85 can be moved toward the bottom wall 71. It is thereby possible for the air-conditioning draft flowing through the inter-fin flow passage 95 to be regulated by the first regulating part 84, and for the air-conditioning draft flowing through the inter-wall flow passage 96 to be regulated by the second regulating part 85. In other words, the air-conditioning drafts flowing through the inter-fin flow passage 95 and the inter-wall flow passage 96 can be simultaneously regulated by the regulating parts: the first and second regulating parts 84 and 85.

Slidably moving the operating knob 91 (FIG. 7) downward adjusts the right inner fins 76 downward, as shown in FIG. 9. Adjusting the right inner fins 76 downward swings the inner fins 81 (including the lowest fin 81a) to a downward incline in the airflow direction of the air-conditioning draft about the left and right inner fin support parts 82 as axes.

In this state, a front end 84a of the first regulating part 84 in the lowest fin 81a approaches the adjacent inner fin 81c, and the inter-fin flow passage 95 is closed off. Consequently, the air-conditioning draft flowing through the inter-fin flow passage 95 can be regulated. Furthermore, a rear end 85a of the second regulating part 85 in the lowest fin 81a approaches the bottom wall 71, and the inter-wall flow passage 96 is closed off. Consequently, the air-conditioning draft flowing through the inter-wall flow passage 96 can be regulated.

In this state, the air-conditioning draft blown to the right discharge port 27 from the air-conditioning device (not shown) is led to the right inner fins 76 as shown by the arrows. The air-conditioning draft led to the right inner fins 76 gathers in central flow passages 98a (see FIG. 7 also) among the flow passages 98 between the inner fins 81, and the air-conditioning draft can be directed downward as shown by the arrows by the central inner fins 81. Consequently, the air-conditioning draft blown downward can be separated from the bottom wall 71, and it is therefore possible to prevent part of the air-conditioning draft from being guided to the bottom wall 71 and led in a different direction. It is thereby possible for all of the air-conditioning draft led to the right discharge port 27 to be blown downward into the passenger compartment 12, and for the air-conditioning draft to be satisfactorily blown downward without reducing the quantity of the air-conditioning draft.

In the discharge port structure 15 of the present embodiment, an example was described in which a center discharge port unit 17 and left and right discharge port units 18 were provided to the top surface of the instrument panel 13, but the region where the discharge port units are provided can be suitably selected.

FIG. 10 shows the mounting positions of a discharge port structure 110 according to the present invention. The discharge port structure 110 according to a second embodiment comprises a bottom discharge port unit 102 provided to a bottom part 23 of the instrument panel 13, roof discharge port units 104 provided to a roof lining (vehicle interior material) 103, pillar discharge port units 107 provided to left and right pillar garnishes (vehicle interior material) 106, and a console discharge port unit 113 provided to a console box (vehicle interior material) 112 between the driver seat and the passenger seat.

The roof discharge port units 104, the pillar discharge port units 107, and the console discharge port unit 113 either are configured similar to the center discharge port unit 17 and the left and right discharge port units 18 described above, or are configured as being rotated 90° relative to the discharge port units 17, 18 around the axial center of the discharge port units.

The discharge port units in this rotated mode have a configuration in which a plurality of inner fins 45, 81 is provided in parallel at predetermined intervals left to right and are supported to be capable of swinging left to right, and a plurality of interior fins 51, 88 is provided in parallel at predetermined vertical intervals and are supported to be capable of swinging vertically. The specific configurations of the discharge port units in this rotated mode can be clarified by switching the directions "up" and "down" with "left" and "right" in the discharge port units, and descriptions of the configurations are therefore omitted.

These discharge port units 104, 107, 113 can also be provided so as to be coplanar (i.e., to preserve continuity) with the roof lining 103, the pillar garnishes 106, and the console 112, and the outward appearance can be further improved.

Furthermore, by preventing some of the air-conditioning draft from being guided to the walls and led in different directions, it is possible to blow all of the air-conditioning drafts led to the discharge ports in the desired direction into the passenger compartment 12, and to satisfactorily blow the air-conditioning draft downward without reducing the quantity of the air-conditioning draft.

The instrument panel 13, the vehicle air-conditioning discharge port structures 15, 110, the center discharge port 24, the center fins 25, the center air-conditioning duct 26, the right discharge port 27, the right fins 28, the right air-conditioning duct 29, the protrusion 36, the inner fins 45, 81, the lowest fins 45a, 81a, the adjacent inner fins 45c, 81c, the left and right inner fin support parts 46, 82, the first regulating parts 47, 84, the second regulating parts 48, 85, the interior fins 51, 88, the roof lining 103, the pillar garnishes 106, the console 112, and other components presented in the embodiment described above are not limited to the shapes described, and suitable modifications can be made. For example, the interior fins 51, 88 may be stationary fins.

The present invention is suitable for application in an automobile comprising a discharge port structure wherein a plurality of fins is provided to a discharge port for blowing out an air-conditioning draft, the orientation of the fins is changed, and the airflow direction is adjusted.

Obviously, various minor changes and modifications of the present invention are possible in light of the above teaching. It is therefore to be understood that within the scope of the appended claims the invention may be practices otherwise than as specifically described.

What is claimed is:

1. A vehicle air-conditioning discharge port structure comprising: a discharge port for discharging air-conditioning drafts blown from an air-conditioning duct; and a plurality of fins provided in parallel at predetermined intervals from a first wall part of the discharge port to a second wall part of the discharge port opposite the first wall part, the fins being capable of adjusting an airflow direction of air-conditioning drafts by changing an orientation thereof, wherein the fins include an outer fin adjacent to an adjacent wall part which is one of the first wall part and the second wall part, and an adjacent fin adjacent to the outer fin, wherein the adjacent wall part has a protrusion with a distal end protruding toward the outer fin, and the outer fin is substantially sheet-shaped and includes a first regulating part and a second regulating part positioned closer to a passenger compartment than the first regulating part, said first and second regulating parts being swingably supported on a fin support part provided between the first regulating part and the second regulating part and said first and second regulating parts being bent about the fin support part at an obtuse angle in a direction away from the distal end of the protrusion to form a dogleg shape, said first regulating part being configured to regulate the air-conditioning drafts flowing through an inter-fin flow passage between the outer fin and the adjacent fin and issuing from said discharge port, said second regulating part being configured to regulate the air-conditioning drafts flowing through an inter-wall flow passage defined between the outer fin and the adjacent wall part, said inter-wall flow passage having an inlet and an outlet downstream of said inlet, the air-conditioning drafts flowing through said inter-wall flow passage flowing through said outlet and issuing from said discharge port, wherein the distal end of the protrusion is positioned closer to the passenger compartment than the fin support part swingably supporting the first and second regulating parts of the outer fin, wherein the outer fin is movable to a first position and a second position relative to the discharge port, and the outer fin is formed such that in the first position the inter-fin flow passage and the inter-wall flow passage are opened for air-conditioning drafts to flow therethrough, and in the second position the air-conditioning draft flowing through the inter-fin flow passage and the air-conditioning draft flowing through the inter-wall flow passage are regulated simultaneously, where the inter-fin flow passage is closed-off by the first regulating part in cooperation with the adjacent fin and the inter-wall flow passage is closed-off by the second regulating part in cooperation with the distal end of the protrusion, and wherein the first regulating part closes-off the inter-fin flow passage as the outer fin is moved to the second position, and the second regulating part closes-off the inter-wall flow passage as the outer fin is moved to the second position.

2. The discharge port structure of claim 1, wherein the protrusion of the adjacent wall part protrudes into an opening of the discharge port defined between the first wall part and the second wall part.

3. The discharge port structure of claim 1, wherein the discharge port is formed such that a distal end thereof is inclined along a surface of a vehicle interior material, wherein the fins comprise: a plurality of interior fins disposed in the distal end of the discharge port in parallel at predetermined horizontal intervals, and also disposed along an inclined direction of the surface; and a plurality of inner fins disposed inward of the interior fins in parallel at predetermined vertical intervals, and also disposed in a direction that intersects the inclined direction of the surface, and wherein the plurality of inner fins comprise the outer fin that is adjacent to the wall part of the discharge port.

4. The discharge port structure of claim 1, wherein the discharge port is formed such that a distal end thereof is inclined along a surface of a vehicle interior material, wherein the fins include: a plurality of interior fins disposed in the distal end of the discharge port in parallel at predetermined longitudinal intervals, and also disposed along an inclined direction of the surface; and a plurality of inner fins disposed inward of the interior fins in parallel at predetermined transverse intervals, and also disposed along the inclined direction of the surface, and wherein the plurality of inner fins comprise the outer fin that is adjacent to the wall part of the discharge port.

5. The discharge port structure of claim 1, wherein the outer fin is formed and the protrusion is positioned such that the second regulating part abuts the protrusion when the outer fin is in the second position.

6. The discharge port structure of claim 1, wherein:
a distance between the adjacent wall part and the outer fin increases along a length of the outer fin from a first end of the outer fin to a second distal end of the outer fin, and
the distal end of the protrusion extends parallel to the outer fin along the length of the outer fin such that a distance between the outer fin and the protrusion is uniform along the length of the outer fin.

7. The discharge port structure of claim 1, wherein the adjacent wall part is the first wall part, the outer fin is a first outer fin and is adjacent to the first wall part, and the adjacent fin is a first adjacent fin and is adjacent to the first outer fin, the discharge port structure further comprising:
a second outer fin adjacent to the second wall part,
a second adjacent fin adjacent to the second outer fin,
wherein the second outer fin is substantially sheet-shaped and includes a front regulating part and a back regulating part, the front regulating part being positioned closer to the passenger compartment than the back regulating part, the front and back regulating parts of the second outer fin being bent about a swingable support part at an obtuse angle in a direction away from the distal end of the protrusion to form a dogleg shape, the back regulating part being configured to regulate the air-conditioning drafts flowing through a second inter-wall flow passage defined between the second outer fin and the second wall part.

8. The discharge port structure of claim 7, wherein the second outer fin is movable to a first position and a second position relative to the discharge port, and the second outer fin is formed such that in the first position the second inter-wall flow passage is opened for air-conditioning drafts to flow therethrough, and in the second position the second inter-wall flow passage is closed-off by the back regulating part in cooperation with the second wall part.

9. The discharge port structure of claim 8, wherein the second outer fin is formed such that, as the second outer fin is moved to the second position, the back regulating part comes into close proximity to the second wall part, whereby the inter-wall flow passage is closed-off by the back regulating part and the second wall part.

10. The discharge port structure of claim 1, wherein the protrusion of the adjacent wall part protrudes inwardly into an opening of the discharge port defined between the first wall part and the second wall part.

\* \* \* \* \*